(12) United States Patent
Nagayama et al.

(10) Patent No.: US 10,866,839 B2
(45) Date of Patent: Dec. 15, 2020

(54) INFORMATION PROCESSING APPARATUS, SERVICE PROCESSING APPARATUS, INFORMATION PROCESSING METHOD, PROGRAM, AND INFORMATION PROCESSING SYSTEM

(71) Applicant: SONY CORPORATION, Tokyo (JP)

(72) Inventors: Tomohiko Nagayama, Tokyo (JP); Masashi Ishikawa, Kanagawa (JP); Masahiro Sueyoshi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 163 days.

(21) Appl. No.: 15/752,952

(22) PCT Filed: Aug. 9, 2016

(86) PCT No.: PCT/JP2016/073495
§ 371 (c)(1),
(2) Date: Feb. 15, 2018

(87) PCT Pub. No.: WO2017/051630
PCT Pub. Date: Mar. 30, 2017

(65) Prior Publication Data
US 2018/0239645 A1     Aug. 23, 2018

(30) Foreign Application Priority Data
Sep. 25, 2015 (JP) .................. 2015-187703

(51) Int. Cl.
*H04L 12/00* (2006.01)
*G06F 9/50* (2006.01)
*G06F 15/00* (2006.01)
*G06F 15/76* (2006.01)
(Continued)

(52) U.S. Cl.
CPC ............ *G06F 9/5055* (2013.01); *G06F 15/00* (2013.01); *G06F 15/76* (2013.01); *G06Q 20/204* (2013.01);
(Continued)

(58) Field of Classification Search
CPC ............ G06Q 20/204; G06Q 20/352; G06Q 20/3226; G06Q 20/3278; G06F 15/00;
(Continued)

(56) References Cited

U.S. PATENT DOCUMENTS 6,681,232 B1 * 1/2004 Sistanizadeh ....... H04L 41/0213
7,293,080 B1 * 11/2007 Clemm .................. H04L 47/10
709/223
(Continued)

FOREIGN PATENT DOCUMENTS

JP    2004-158977 A    6/2004
JP    2004-274429 A    9/2004
(Continued)

OTHER PUBLICATIONS

Kanbe et al., A Discussion on Ubiquitous Computing Resources Management with Smart Card, IEICE Technical Report, Mar. 8, 2004, vol. 103, No. 709, pp. 13-18.

*Primary Examiner* — Frantz Coby
(74) *Attorney, Agent, or Firm* — Paratas Law Group, PLLC

(57) ABSTRACT

There is provided an information processing apparatus, a service processing apparatus, an information processing method, a program, and an information processing system, which are capable of appropriately determining a service processing apparatus as a connection destination from among a plurality of service processing apparatuses without using any special apparatus, the information processing apparatus including: a transmission control unit that causes a first communication unit to transmit an inquiry about whether or not processing of a first service requested by a user is able to be performed to a plurality of service processing apparatuses; and a connection destination determination unit that determines any service processing apparatus capable of performing the processing of the first
(Continued)

service from among the plurality of service processing apparatuses as a connection destination on a basis of response information that is received from one or more of the plurality of service processing apparatuses.

15 Claims, 9 Drawing Sheets

(51) Int. Cl.
    *G06Q 20/20*     (2012.01)
    *G06Q 20/32*     (2012.01)
    *G06Q 20/34*     (2012.01)

(52) U.S. Cl.
    CPC ..... *G06Q 20/3226* (2013.01); *G06Q 20/3278* (2013.01); *G06Q 20/352* (2013.01)

(58) Field of Classification Search
    CPC ...... G06F 9/5055; G06F 17/245; G06F 9/905; H04M 15/816; H04L 67/16
    USPC .................................................. 709/226, 223
    See application file for complete search history.

(56) References Cited

U.S. PATENT DOCUMENTS

| | | | | |
|---|---|---|---|---|
| 7,539,764 | B2 * | 5/2009 | Bagsby | G06Q 40/02 709/229 |
| 7,984,154 | B2 * | 7/2011 | Monga | H04L 41/0226 709/226 |
| 8,943,212 | B2 * | 1/2015 | Monga | H04L 67/36 709/229 |
| 9,191,330 | B2 * | 11/2015 | Clark | H04L 45/121 |
| 9,379,997 | B1 * | 6/2016 | Vosshall | H04L 67/42 |
| 9,603,022 | B2 * | 3/2017 | Laarakkers | H04L 63/145 |
| 10,084,866 | B1 * | 9/2018 | Yamanoha | H04L 67/16 |
| 2012/0246319 | A1 * | 9/2012 | Um | G06F 9/5061 709/226 |
| 2013/0166703 | A1 * | 6/2013 | Hammer | H04L 63/10 709/220 |
| 2013/0185439 | A1 * | 7/2013 | Velasco | H04L 47/70 709/226 |
| 2015/0046080 | A1 * | 2/2015 | Wesselius | G08G 1/202 701/428 |
| 2015/0082418 | A1 * | 3/2015 | Gu | H04L 12/4633 726/15 |
| 2016/0299783 | A1 * | 10/2016 | Combellas | G06F 9/505 |
| 2016/0352924 | A1 * | 12/2016 | Senarath | H04M 15/8016 |
| 2017/0041201 | A1 * | 2/2017 | Ilyadis | H04L 43/08 |
| 2019/0050383 | A1 * | 2/2019 | Kim | G06F 17/245 |

FOREIGN PATENT DOCUMENTS

| | | |
|---|---|---|
| JP | 2006-185095 A | 7/2006 |
| JP | 2008-015660 A | 1/2008 |
| JP | 2014-222480 A | 11/2014 |

* cited by examiner

INFORMATION PROCESSING APPARATUS, SERVICE PROCESSING APPARATUS, INFORMATION PROCESSING METHOD, PROGRAM, AND INFORMATION PROCESSING SYSTEM

CROSS REFERENCE TO PRIOR APPLICATION

This application is a National Stage Patent Application of PCT International Patent Application No. PCT/JP2016/073495 (filed on Aug. 9, 2016) under 35 U.S.C. § 371, which claims priority to Japanese Patent Application No. 2015-187703 (filed on Sep. 25, 2015), which are all hereby incorporated by reference in their entirety.

TECHNICAL FIELD

The present disclosure relates to an information processing apparatus, a service processing apparatus, an information processing method, a program, and an information processing system.

BACKGROUND ART

In the related art, various technologies for making processing efficient by installing a plurality of apparatuses have been developed.

For example, Patent Literature 1 describes a technology in which a plurality of servers and a load distribution apparatus are installed and the load distribution apparatus assigns a packet to any of the plurality of servers on the basis of attribute information of the packet received from a client via an external network.

CITATION LIST

Patent Literature

Patent Literature 1: JP 2004-158977A

DISCLOSURE OF INVENTION

Technical Problem

However, it is necessary to install the load distribution apparatus to determine the server to which the packet is to be assigned according to the technology described in Patent Literature 1. Therefore, the technology described in Patent Literature 1 makes a system configuration complicated.

Thus, the present disclosure proposes an information processing apparatus, a service processing apparatus, an information processing method, a program, and an information processing system, which are novel and improved, and which are capable of appropriately determining a service processing apparatus as a connection destination from among a plurality of service processing apparatuses without using any special apparatus.

Solution to Problem

According to the present disclosure, there is provided an information processing apparatus including: a transmission control unit that causes a first communication unit to transmit an inquiry about whether or not processing of a first service requested by a user is able to be performed to a plurality of service processing apparatuses; and a connection destination determination unit that determines any service processing apparatus capable of performing the processing of the first service from among the plurality of service processing apparatuses as a connection destination on a basis of response information that is received from one or more of the plurality of service processing apparatuses.

Further, according to the present disclosure, there is provided a service processing apparatus including: a service management unit that activates any of a plurality of services on a basis of a predetermined judgement criterion; and a service execution unit that executes processing related to a service that is activated on a basis of a processing request that is received from an information processing apparatus.

Further, according to the present disclosure, there is provided an information processing method including: causing a first communication unit to transmit an inquiry about whether or not processing of a first service requested by a user is able to be performed to a plurality of service processing apparatuses; and determining, by a processor, any service processing apparatus capable of performing the processing of the first service from among the plurality of service processing apparatuses as a connection destination on a basis of response information that is received from one or more of the plurality of service processing apparatuses.

Further, according to the present disclosure, there is provided a program that causes a computer to function as: a transmission control unit that causes a first communication unit to transmit an inquiry about whether or not processing of a first service requested by a user is able to be performed to a plurality of service processing apparatuses; and a connection destination determination unit that determines any service processing apparatus capable of performing the processing of the first service from among the plurality of service processing apparatuses as a connection destination on a basis of response information that is received from one or more of the plurality of service processing apparatuses.

Further, according to the present disclosure, there is provided an information processing system including: an information processing apparatus; and a plurality of service processing apparatuses, in which the information processing apparatus includes a transmission control unit that causes a first communication unit to transmit an inquiry about whether or not processing of a first service requested by a user is able to be performed to the plurality of service processing apparatuses, and a connection destination determination unit that determines any service processing apparatus capable of performing the processing of the first service from among the plurality of service processing apparatuses as a connection destination on a basis of response information that is received from one or more of the plurality of service processing apparatuses, and each of the plurality of service processing apparatuses includes a service management unit that activates any of a plurality of services on a basis of a predetermined judgement criterion, and a service execution unit that executes processing related to the first service on a basis of a processing request that is received from the information processing apparatus.

Advantageous Effects of Invention

According to the present disclosure, as described above, it is possible to appropriately determine a service processing apparatus that is a connection destination from a plurality of service processing apparatuses without using any special apparatus. In addition, the effects described here are not

MODE(S) FOR CARRYING OUT THE INVENTION

Figure 1:
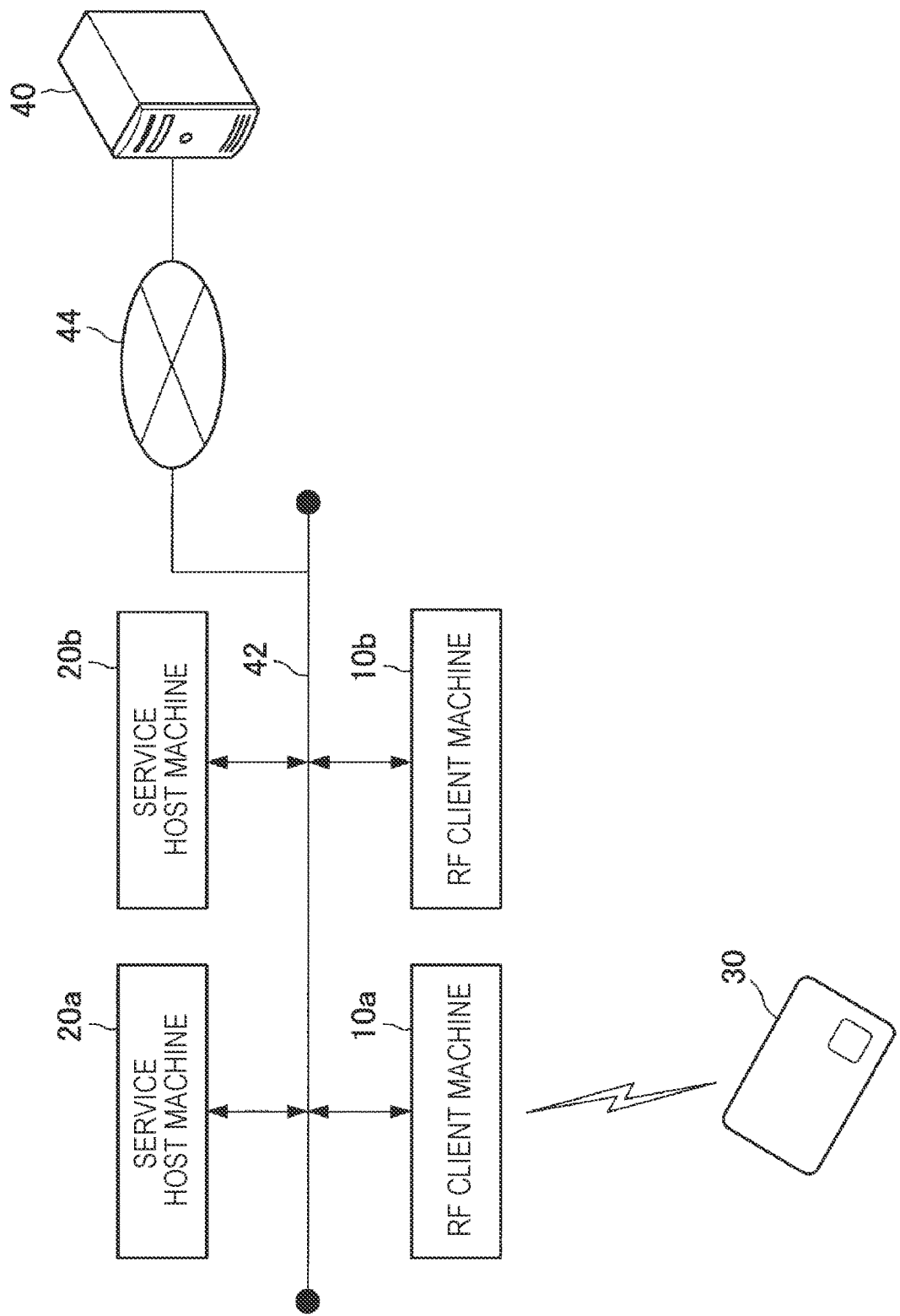
FIG. 1 is an explanatory diagram illustrating a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, there are also cases in which a plurality of components that have substantially the same functional configurations are distinguished by attaching different letters after the same reference numerals in the specification and the drawings. For example, a plurality of configurations that have substantially the same functional configurations are distinguished as an RF client machine 10a and an RF client machine 10b as needed. However, only the same reference numerals are attached when it is not particularly necessary to distinguish the plurality of components that have substantially the same functional configuration. When it is not particularly necessary to distinguish the RF client machine 10a and the RF client machine 10b, for example, the RF client machine 10a and the RF client machine 10b will simply be referred to as an RF client machine 10.

In addition, the "Modes for Carrying Out the Invention" will be described in the order of items described below
1. Basic configuration of information processing system
2. Detailed description of embodiment
3. Hardware configuration
4. Modification examples

1. BASIC CONFIGURATION OF INFORMATION PROCESSING SYSTEM 1-1. Background

First, a background in which the embodiment was contrived will be described in order to clearly illustrate features of the present disclosure.

In the related art, electronic money terminals are installed at various shops, and electronic money services are widely used. However, the cost of introducing electronic money terminals in shops has been problematic. For example, since known electronic money terminals are generally expensive, shops in which a use frequency of electronic money is expected to be low have faced situations in which they have no choice but to forgo the introduction of electronic money terminals from the viewpoint of cost-effectiveness.

Also, known electronic money terminals have a problem that users are temporarily unable to use the electronic money terminals at all while electronic money services are stopped. For example, known electronic money terminals function both as a service unit and as a holding unit. Therefore, in a case in which services are temporarily stopped, for example, in a case in which the electronic money terminals transmit log information related to services to a predetermined server, the function of the holding unit cannot be used at the same time.

Thus, the embodiment has been contrived in view of the above circumstances. According to the embodiment, a radio frequency (RF) client machine 10 that functions as a holding unit and a service host machine 20 that functions as a service unit are configured as separate devices. In addition, the RF client machine 10 can dynamically determine the service host machine 20 that is a connection destination related to a service requested by a user, and a special connection management device is not needed. Hereinafter, such an embodiment will be sequentially described in detail.

1-2. Basic Configuration

First, a configuration of an information processing system according to the embodiment will be described with reference to FIG. 1. As illustrated in FIG. 1, the information processing system according to the embodiment has the RF client machine 10, the service host machine 20, an IC card 30, a server 40, a first communication network 42, and a second communication network 44.

[1-1-1. RF Client Machine 10]

The RF client machine 10 is an example of the information processing apparatus according to the present disclosure. The RF client machine 10 is an apparatus for providing services to users in conjunction with the service host machine 20. The RF client machine 10 functions as a holding unit. For example, the user can use a service registered in the IC card 30 by holding the IC card 30 that the user owns over (a non-contact communication unit 126, which will be described later, in) the RF client machine 10. Here, the service is an electronic money service, for example. However, the service is not limited to such an example and may be a point service or a function of individual authentication, such as member authentication, for example. In addition, an example in which the service is an electronic money service will be mainly described below.

For example, the RF client machine 10 can perform non-contact communication in accordance with near field communication (NFC), for example, with the IC card 30. Also, the RF client machine 10 can communicate with a plurality of service host machines 20, which are connected to the first communication network 42, via the first communication network 42.

The RF client machine 10 can be installed at a shop such as a retail shop, a commercial facility, a leisure facility, a station, or the like, for example. For example, RF client machines 10 can be installed at a plurality of shops that are run by the same business operator. In addition, an example in which the RF client machine 10 is installed in a shop will be mainly described below

[1-1-2. Service Host Machine 20]

The service host machine 20 is an example of the service processing apparatus according to the present disclosure. The service host machine 20 is an apparatus for providing a service to a user in conjunction with the RF client machine 10. The service host machine 20 has a function of executing processing related to a service requested by the user. For example, the service host machine 20 receives a service processing request related to the IC card 30 that is held over the RF client machine 10 from the RF client machine 10 and then executes processing in accordance with the received processing request.

In addition, this service host machine 20 can basically perform only processing related to one type of service at one time. Therefore, in a case in which processing related to a different type of service from a service that is currently activated is performed, the service host machine 20 performs processing of switching the service first and then performs processing related to a service of that type after the switching.

In addition, the service host machine 20 can, for example, periodically transmit log information related to executed processing to the server 40 via the first communication network 42 and the second communication network 44.

This service host machine 20 can be installed in a facility (such as a shop) in which the RF client machine 10 is installed, for example. In addition, a shop in which a certain RF client machine 10 is installed and a shop in which a certain service host machine 20 is installed may be different. In addition, the service host machine 20 can also be installed in a facility in which the RF client machine 10 is not installed and which is connected to the first communication network 42.

[1-1-3. IC Card 30]

The IC card 30 is a card in which an IC chip (not illustrated) that can perform non-contact communication is incorporated. This IC card 30 stores various types of data related to a service registered for use in the IC chip, for example. For example, the IC card 30 stores identification information of electronic money registered for use and a balance of an accumulated price (value) in relation to the electronic money in the IC chip.

In addition, the IC card 30 can perform processing of updating data that is stored in the IC chip on the basis of a processing request or the like that is received from the RF client machine 10, for example.

[1-1-4. Server 40]

The server 40 is an apparatus for storing log information or the like of processing related to a service that has been executed by the service host machine 20, for example.

[1-1-1-5. First Communication Network 42]

The first communication network 42 is a wired or wireless transmission path of information that is transmitted from an apparatus connected to the first communication network 42. For example, the first communication network 42 is a local area network (LAN) of a business operator who runs a shop.

[1-1-6. Second Communication Network 44]

The second communication network 44 is a wired or wireless transmission path of information that is transmitted from an apparatus connected to the second communication network 44. This second communication network 44 is connected to the first communication network 42.

For example, the second communication network 44 includes a public line network such as a telephone line network, the Internet, or a satellite communication network, or various LANs including Ethernet (registered trademark), a wide area network (WAN), and the like. In addition, the second communication network 44 may include a dedicated line network such as an Internet protocol-virtual private network (IP-VPN).

2. DETAILED DESCRIPTION OF EMBODIMENT

2-1. Configuration

[2-1-1. RF Client Machine 10]

Figure 2:
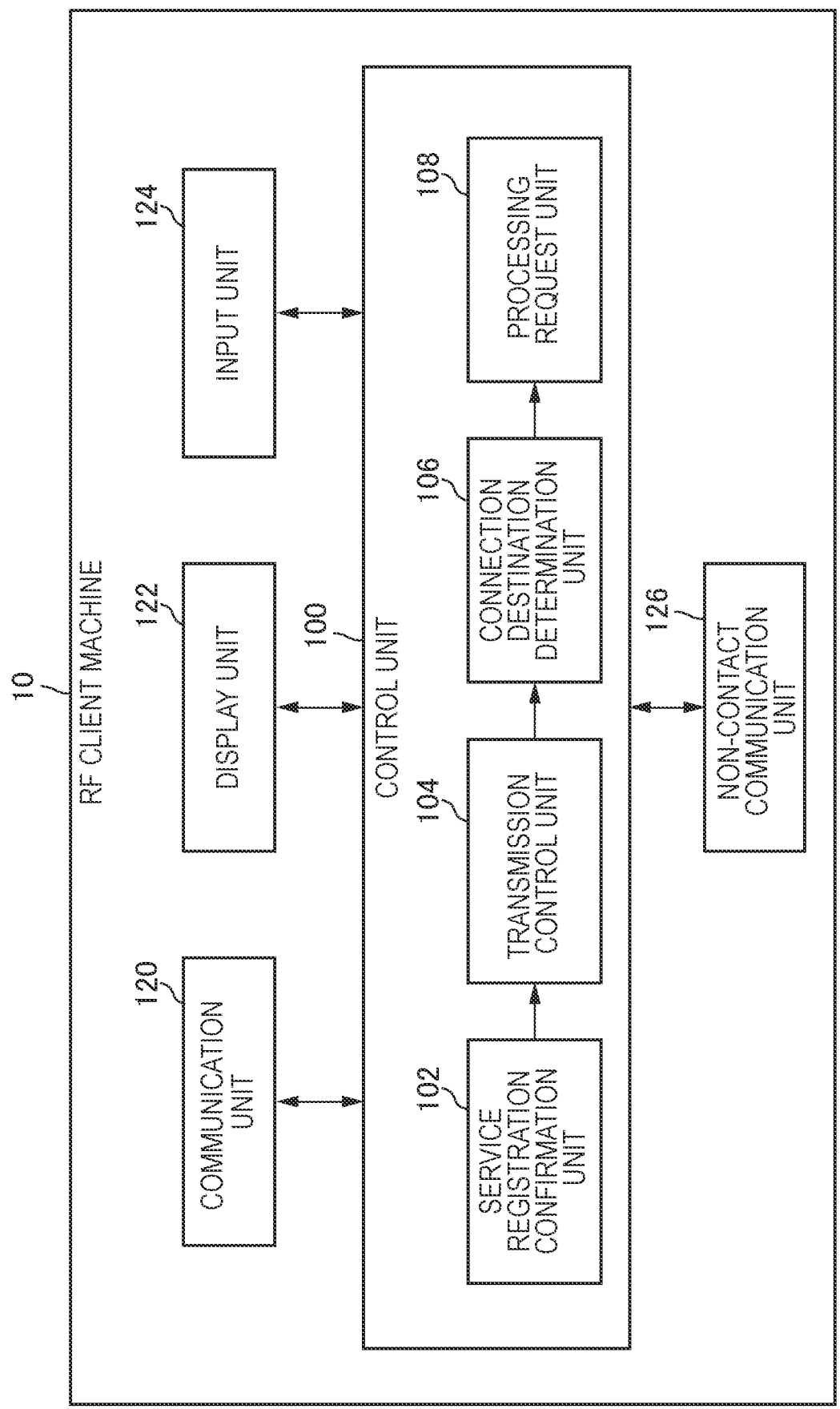
FIG. 2 is a functional block diagram illustrating a configuration example of an RF client machine 10 according to the embodiment.

The configuration of the information processing system according to the embodiment has been described above. Next, the configuration according to the embodiment will be described in detail. FIG. 2 is a functional block diagram illustrating a configuration example of the RF client machine 10 according to the embodiment. As illustrated in FIG. 2, the RF client machine 10 has a control unit 100, a communication unit 120, a display unit 122, an input unit 124, and a non-contact communication unit 126.

(2-1-1-1. Control Unit 100)

The control unit 100 comprehensively controls operations of the RF client machine 10 by using hardware such as a central processing unit (CPU) 150 and a random access memory (RAM) 154 that are incorporated in the RF client machine 10, which will be described later. In addition, the control unit 100 has a service registration confirmation unit 102, a transmission control unit 104, a connection destination determination unit 106, and a processing request unit 108 as illustrated in FIG. 2.

(2-1-1-2. Service Registration Confirmation Unit 102)

The service registration confirmation unit 102 performs processing of confirming whether or not registration information related to a service requested by the user is stored in the IC card 30. For example, the service registration confirmation unit 102 causes the non-contact communication unit 126 to transmit an inquiry about whether or not the registration information related to the service requested by the user is stored in the IC card 30 to the IC card 30 that is held over the non-contact communication unit 126. In addition, the registration information related to the service can include information indicating presence of use authority related to the service, for example.

(2-1-1-3. Transmission Control Unit 104)

The transmission control unit 104 controls transmission of information to another apparatus. In a case in which it has been confirmed that the registration information related to the service requested by the user is stored in the IC card 30, for example, the transmission control unit 104 causes the communication unit 120 to transmit the inquiry about whether or not the processing of the service can be performed to all service host machines 20 connected to the first communication network 42.

(2-1-1-4. Connection Destination Determination Unit 106)

The connection destination determination unit 106 determines any of a plurality of service host machines 20 as a connection target related to the service requested by the user on the basis of response information received from one or more of the plurality of service host machines 20 in response to the inquiry about whether or not the processing can be performed that has been transmitted to the plurality of service host machines 20. That is, the connection destination determination unit 106 dynamically determines a connection destination related to the service requested by the user from among the plurality of service host machines 20. In addition, the response information includes information indicating whether or not the processing of the service requested by the user can be performed. In addition, the response information can further include information indicating a type of a service that is currently activated in the service host machine 20 that is a transmission source of the response information.

In a case in which the response information received from one or more service host machines 20 indicates that the processing of the service requested by the user can be performed, for example, the connection destination determination unit 106 determines any of the one or more service host machines 20 as a connection destination in accordance with a predetermined selection algorithm. In one example, the connection destination determination unit 106 may determine, as a connection destination, the service host machine 20 that is the transmission source of the earliest received response information indicating that the processing of the service requested by the user can be performed.

In addition, the connection destination determination unit 106 can also determine, as the connection destination, any of the plurality of service host machines 20 further on the basis of types of services currently activated in one or more service host machines 20, which is indicated in response information received by each of the service host machines 20. In a case in which a service that is currently activated and is indicated in the response information received from any of the plurality of service host machines 20 and a service requested by the user coincide with each other, for example, the connection destination determination unit 106 may determine, as the connection destination, the service host machine 20 that is a transmission source of the response information.

Determination Example 1 of Connection Destination

Figure 3:
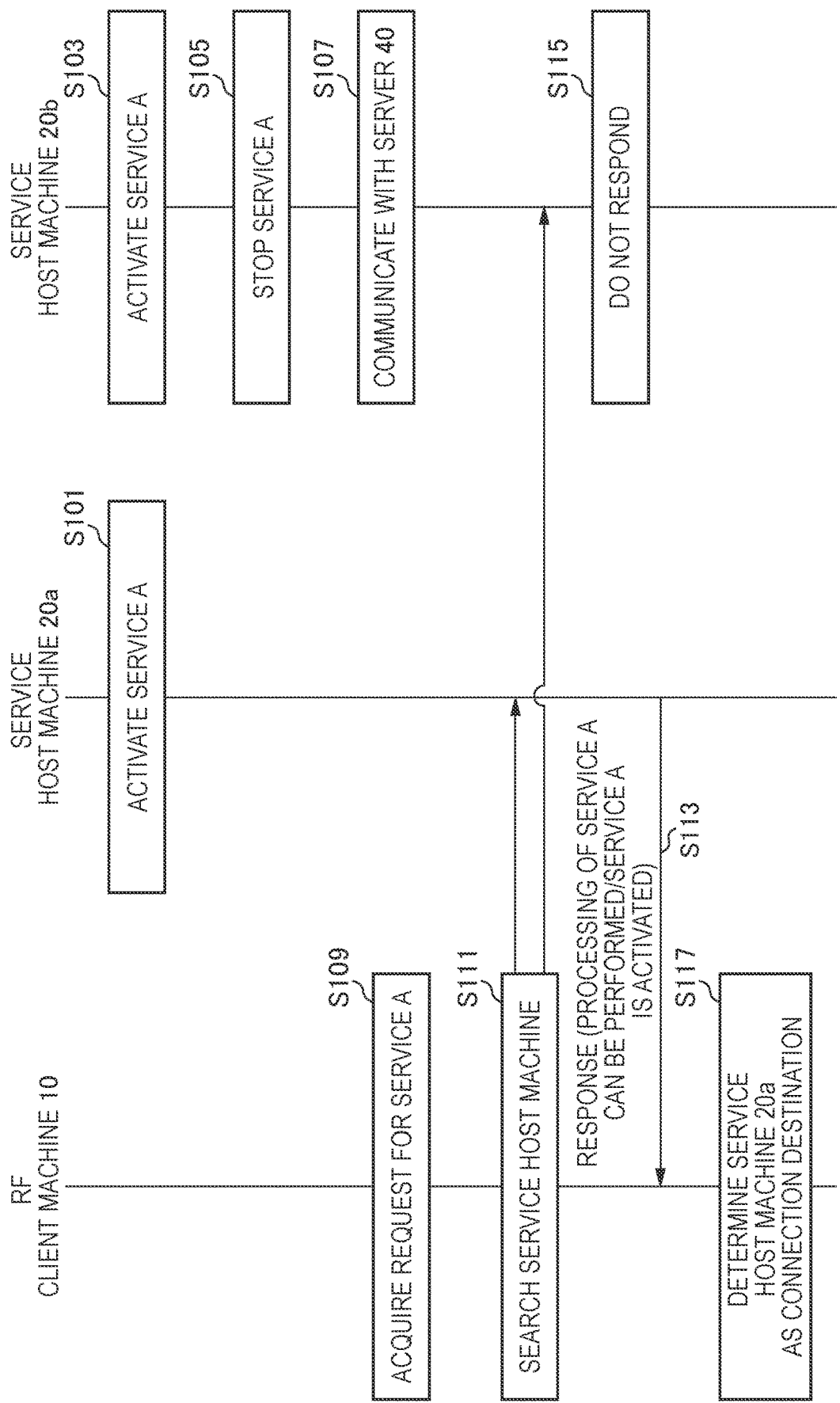
FIG. 3 is an explanatory diagram illustrating an example of a method of determining a connection destination performed by the RF client machine 10 according to the embodiment.

Here, the above function will be described in more detail with reference to FIGS. 3 to 5. FIG. 3 is an explanatory diagram illustrating an example of a method of determining a connection destination by (the connection destination determination unit 106 of) the RF client machine 10. In the example illustrated in FIG. 3, an example in which two service host machines 20 (a service host machine 20a and a service host machine 20b) are installed is shown. In addition, it is assumed that the service host machine 20a activates a "service A" in advance (S101) and the service host machine 20h also activates the "service A" in advance (S103). In addition, it is assumed that the service host machine 20b stops the "service A" after S103 (S105), and then communicates with the server 40, for example, transmits log information or the like (S107).

In addition, it is assumed that the RF client machine 10 acquires a request for the "service A" from the user (S109) after S107.

In such a case, the transmission control unit 104 of the RF client machine 10 causes the communication unit 120 to transmit an inquiry about whether or not the processing of the "service A" can be performed to the two service host machines 20 first (S111).

Thereafter, the service host machine 20a transmits response information indicating that the processing of the "service A" can be performed (and that the type of the service that is activated is the "service A") to the RF client machine 10 on the basis of the received inquiry (S113).

In addition, the service host machine 20b does not respond to the received inquiry (S115) since the service host machine 20b is currently communicating with the server 40, which will be described in detail later. In this manner, the RF client machine 10 excludes the service host machine 20b as a connection target since the response information is not received from the service host machine 20b.

Here, the response information received in S113 indicates that the processing of the "service A" can be performed. Thus, the connection destination determination unit 106 determines, as the connection destination, the service host machine 20a that is the transmission source of the response information in S113 (S117).

Determination Example 2 of Connection Destination

Figure 4:
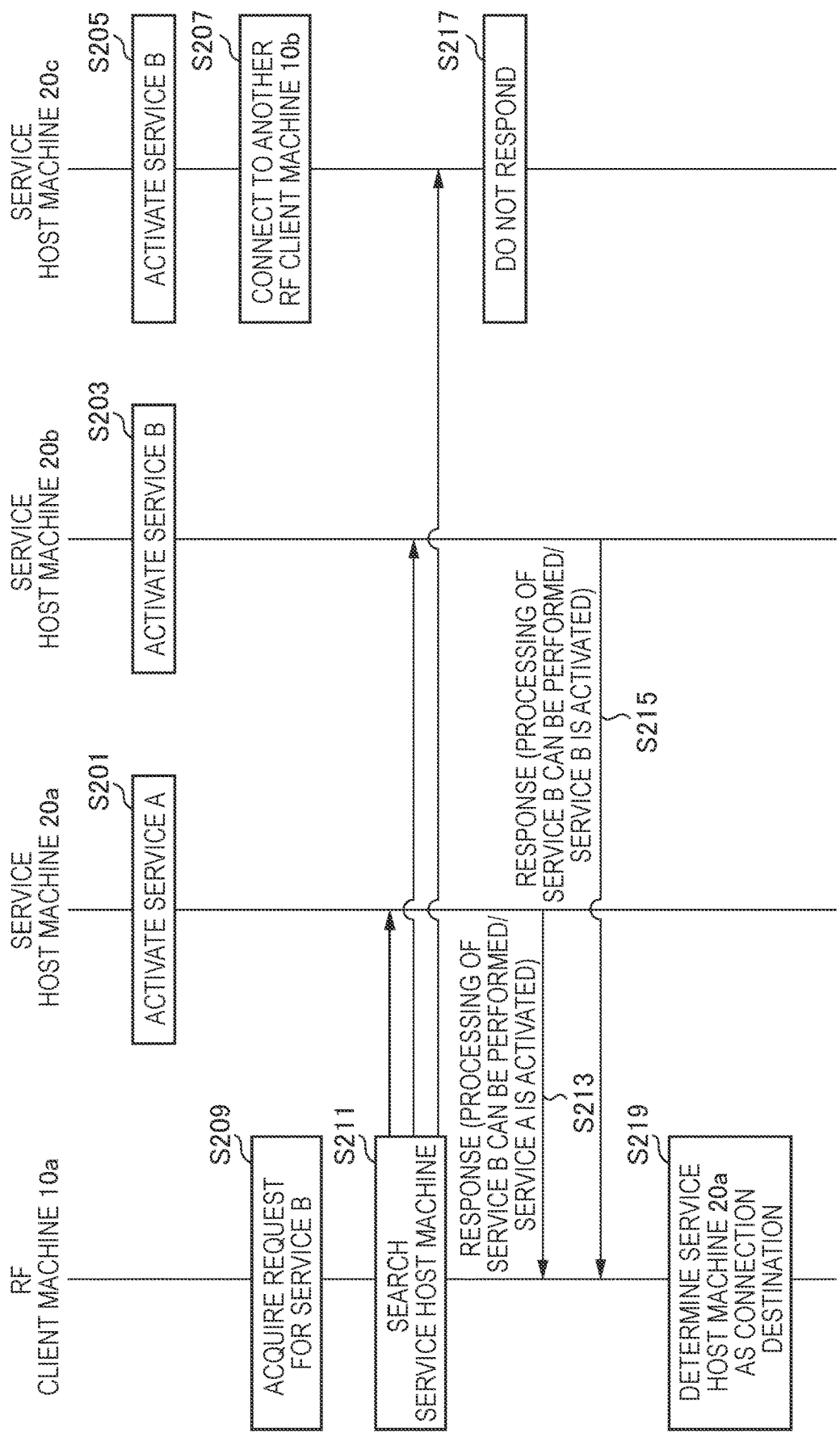
FIG. 4 is an explanatory diagram illustrating an example of a method of determining a connection destination performed by the RF client machine 10 according to the embodiment.

Also, FIG. 4 is an explanatory diagram illustrating another example of a method of determining a connection destination by (the connection destination determination unit 106 of) the RF client machine 10a.

The example illustrated in FIG. 4 shows an example in which three service host machines 20 (a service host machine 20a, a service host machine 20b, and a service host machine 20c) are installed. In addition, it is assumed that all the three service host machines 20 can perform processing of a "service A" and a "service B." In addition, it is assumed that the service host machine 20a activates the "service A" in advance (S201), the service host machine 20b activates the "service B" in advance (S203), and the service host machine 20c activates the "service B" in advance (S205). In addition, it is assumed that the service host machine 20c is connected to another RF client machine 10b (S207) after S205. Further, it is assumed that the RF client machine 10a acquires a request of the "service B" by the user (S209).

In such a case, the transmission control unit 104 of the RF client machine 10a causes the communication unit 120 to transmit an inquiry about whether or not processing of the "service B" can be performed to all the service host machines 20 first (S211).

Thereafter, the service host machine 20a transmits response information indicating that processing of the "service B" can be performed and that the type of the service that is activated is the "service A" to the RF client machine 10a on the basis of the received inquiry (S213). Similarly, the service host machine 20b transmits response information indicating that processing of the "service B" can be performed and that the type of the service that is activated is the "service B" to the RF client machine 10a on the basis of the received inquiry (S215).

In addition, the service host machine 20c does not respond to the received inquiry (S217) in the same manner as in the example illustrated in FIG. 3 since the service host machine 20c is connected to another RF client machine 10b. In this manner, the RF client machine 10a excludes the service host machine 20c as a connection target since the response information is not received from the service host machine 20c.

Here, both the response information received in S213 and the response information received in S215 indicate that the processing of the "service B" can be performed. Thus, the connection destination determination unit 106 determines, as a connection destination, the service host machine 20a that is a transmission source of the response information received earlier, that is, the response information received in S213, for example (S219).

Modification Examples

In addition, while the service requested by the user is the "service B", the service that is currently activated, which is indicated in the response information received in S213, is the "service A", and both are different. Meanwhile, the service that is currently activated, which is indicated in the response information received in S215, is the "service B and coincides with the service requested by the user. Thus, the connection destination determination unit 106 may determine, as a connection destination, the service host machine 20b that serves as the transmission source of the response information in S215 in a modification example of S219.

According to this modification example, the RF client machine 10 can dynamically determine, as the connection destination related to the service requested by the user, the service host machine 20 that is currently activating the service. As described above, it is necessary to perform processing of switching services in a case in which processing related to a service of a different type from the service that the service host machine 20 is currently activating. According to the modification example, it is possible to eliminate necessity of the processing of switching the services by the service host machine 20. As a result, it is possible to reduce a time for the user to wait for provision of the requested service.

Determination Example 3 of Connection Destination

Figure 5:
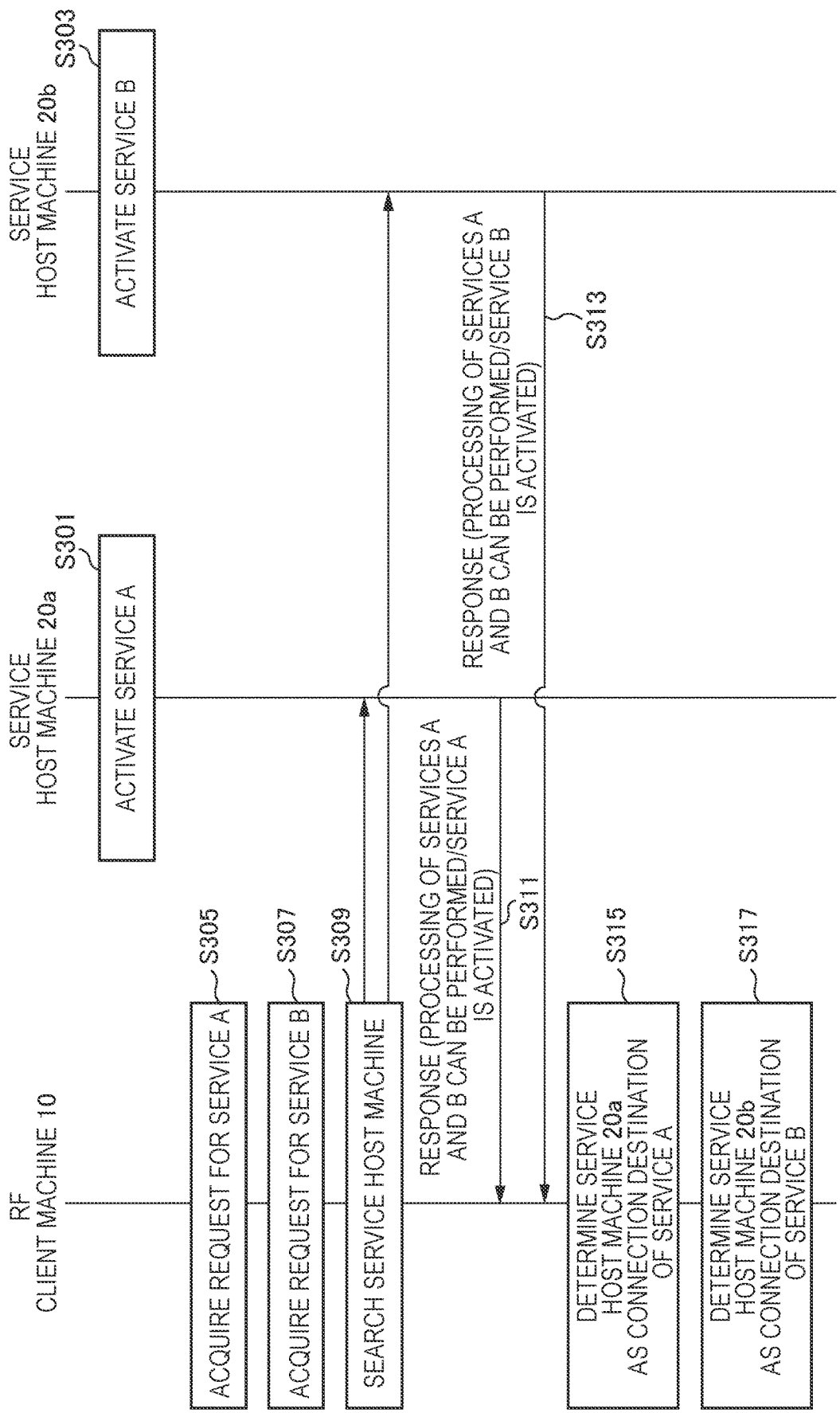
FIG. 5 is an explanatory diagram illustrating an example of a method of determining a connection destination performed by the RF client machine 10 according to the embodiment.

In addition, FIG. 5 is an explanatory diagram illustrating a yet another example of the method of determining a connection destination by (the connection destination determination unit 106 of) the RF client machine 10. The example illustrated in FIG. 5 shows an example in which two service host machines 20 (a service host machine 20a and a service host machine 20b) are installed. In addition, it is assumed that the two service host machines 20 can perform processing of a "service A" and a service B". In addition, it is assumed that the service host machine 20a activates the "service A" in advance (S301), and the service host machine 20b activates the "service B" in advance (S303).

In addition, it is assumed that the RF client machine 10 acquires a request of the "service A" by the user (S305) after S303 and then acquires a request of the "service B" by the user (S307).

In such a case, the transmission control unit 104 of the RF client machine 10 causes the communication unit 120 to transmit an inquiry about whether or not processing of the "service A" and the "service B" can be performed, for example, to the two service host machines 20 (S309).

Thereafter, the service host machine 20a transmits response information indicating that the processing of the "service A" and the "service B" can be performed and that the type of the service that is activated is the "service A" to the RF client machine 10 on the basis of the requested inquiry (S311). In addition, the service host machine 20b transmits response information indicating that the processing of the "service A" and the "service B" can be performed and that the type of the service that is activated is the "service B" to the RF client machine 10 on the basis of the received inquiry (S313).

Thus, the connection destination determination unit 106 determines the service host machine 20a that serves as the transmission source of the response information in S311 as a connection destination related to the "service A" (S315). Then, the connection destination determination unit 106 determines the service host machine 20b that serves as the transmission source of the response information in S313 as a connection destination related to the "service B" (S317).

According to the determination example, the RF client machine 10 can provide each service on the basis of the judgement made by itself in a case in which a plurality of types of services are requested by the user. In a case in which the services are requested by the user in an order of the "service A" the "service B", for example, the RF client machine 10 can make a judgment that connection is established in the order of the service host machine 20a that is activating the "service A" and the service host machine 20b that is activating the "service B". As a result, it becomes not necessary for the service host machines 20 to perform processing of switching the services even in a case in which different types of services are requested, for example.

(2-1-1-5. Processing Request Unit 108)

The processing request unit 108 causes the communication unit 120 to transmit a service processing request requested by the user to the service host machine 20 that has been determined to be the connection destination by the connection destination determination unit 106.

(2-1-1-6. Communication Unit 120)

The communication unit 120 is an example of the first communication unit according to the present disclosure. The communication unit 120 transmits and receives information to and from the service host machines 20 via the first communication network 42, for example. For example, the communication unit 120 transmits an inquiry about whether or not processing of the services requested by the user can be performed on all the service host machines 20 connected to the first communication network 42 in accordance with control performed by the transmission control unit 104. In addition, the communication unit 120 receives response information to the inquiry about whether or not the processing of the service can be performed from the service host machines 20.

(2-1-1-7. Display Unit 122)

The display unit 122 displays a display screen in accordance with control performed by the control unit 100. For example, the display unit 122 displays an input screen for inputting the type and the content of the service requested by the user.

(2-1-1-8. Input Unit 124)

The input unit 124 receives an input by the user. For example, the input unit 124 receives an operation of selecting any of a plurality of types of services displayed on the display unit 122 by, for example, a shop staff, a user, or the like.

(2-1-1-9. Non-Contact Communication Unit 126)

The non-contact communication unit 126 is an example of the second communication unit according to the present disclosure. The non-contact communication unit 126 performs non-contact communication in accordance with standards, such as NFC, for example, with the IC card 30 on the basis of approach of the IC card 30, for example. For example, the non-contact communication unit 126 acquires information that is stored in the IC card 30 from the IC card 30 by a reader 170, which will be described later, transmitting a high-frequency carrier wave to the IC card 30. Alternatively, the non-contact communication unit 126 can also acquire the information that is stored in the IC card 30 from the IC card 30 by an IC chip 166, which will be described later, receiving a high-frequency carrier wave emitted from the IC card 30.

Note that the configuration of the RF client machine 10 is not limited to the aforementioned configuration. For example, the display unit 122 and the input unit 124 may be integrally configured as a touch panel, for example. Alternatively, the display unit 122 or the input unit 124 may be included in another apparatus (not illustrated) that can communicate with the RF client machine 10 via the first communication network 42 instead of being included in the RF client machine 10.

[2-1-2. Service Host Machine 20]

Figure 6:
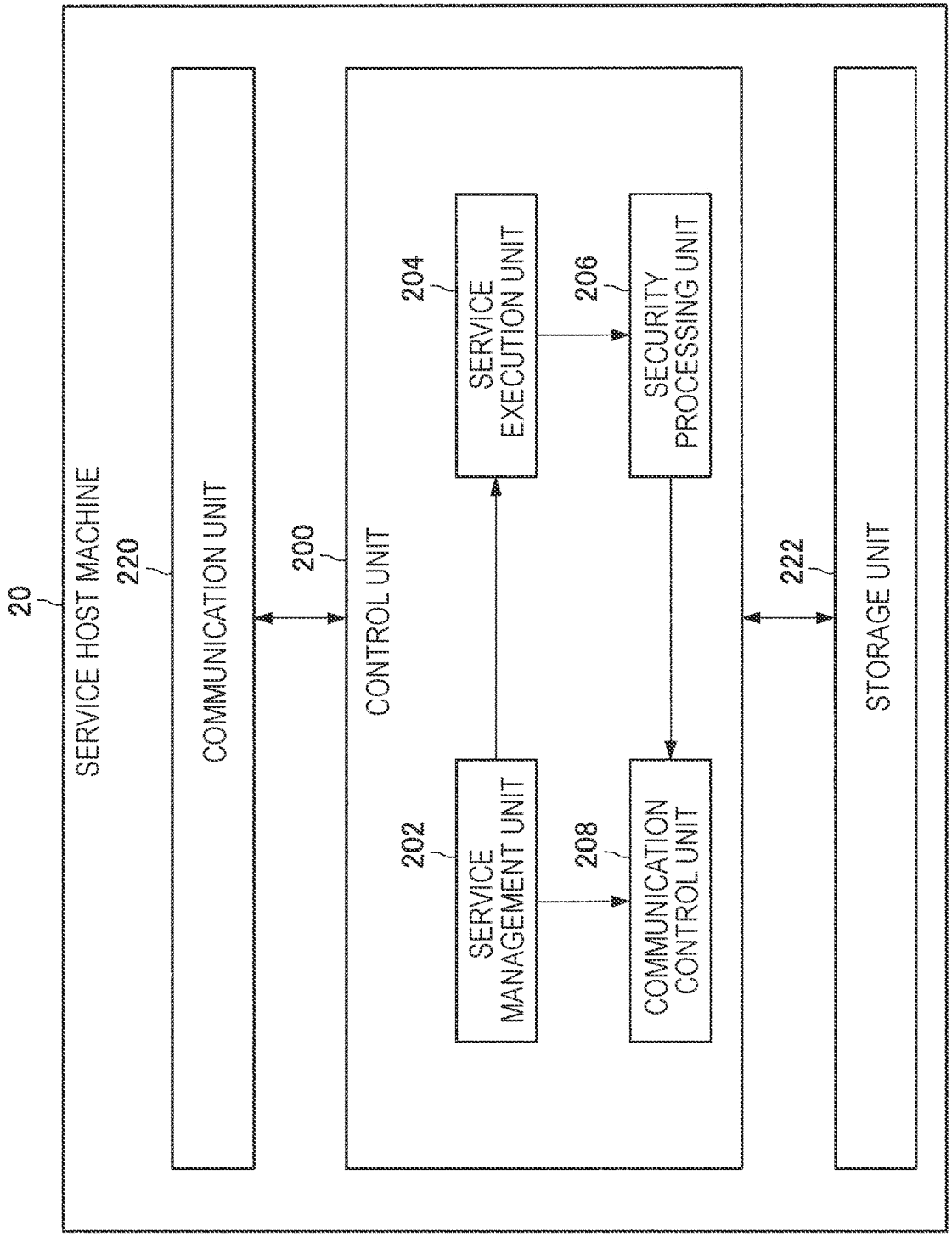
FIG. 6 is a functional block diagram illustrating a configuration example of a service host machine 20 according to the embodiment.

FIG. 6 is a functional block diagram illustrating a configuration of the service host machine 20 according to the embodiment. As illustrated in FIG. 6, the service host machine 20 has a control unit 200, a communication unit 220, and a storage unit 222.

(2-1-2-1. Control Unit 200)

The control unit 200 comprehensively controls operations of the service host machine 20 by using hardware such as a CPU and a RAM incorporated in the service host machine 20. In addition, the control unit 200 has a service management unit 202, a service execution unit 204, a security processing unit 206, and a communication control unit 208 as illustrated in FIG. 6.

(2-1-2-2. Service Management Unit 202)

The service management unit 202 activates any of the plurality of services on the basis of a predetermined judgement criterion. The service management unit 202 activates any of the plurality of services on the basis of the predetermined judgement criterion before the inquiry about whether or not processing of the services can be performed is received from the RF client machine 10, for example.

For example, the service may be an electronic money service, and the service management unit 202 may activate electronic money of a type with the highest use frequency in advance on the basis of a payment history (of the service host machine 20) that is stored in the storage unit 222. According to the control example, since each of the plurality of service host machines 20 activates "electronic money A" in advance in a case in which use frequency of the "electronic money A", for example, is the highest in a corresponding shop, it is possible to more quickly provide the "electronic money A" in a case in which the "electronic money A" is requested by the user.

Alternatively, the service management unit 202 may activate a service with the highest miss hit rate in advance on the basis of a rate (hereinafter, also referred to as a miss hit rate in some cases) at which it is not possible to respond to the inquiry about whether or not processing of services can be performed from the RF client machine 10, which is stored in the storage unit 222. According to the control example, it is possible to gradually reduce the miss hit rate since probability at which it becomes possible to provide the service with the highest miss hit rate is improved thereafter. As a result, it is possible to make provision of services efficient.

Alternatively, the service management unit 202 may activate different types of services in advance depending on time zones. For example, since segments of customers who come to a shop can differ depending on time zones, types of services that are requested by users at high frequencies can differ depending on time zones. According to the control example, it is possible to make provision of services efficient since the services that are requested at high frequencies are activated depending on the time zones.

Alternatively, the service management unit 202 may continue to activate a service that is provided immediately before. According to the control example, the number of service host machines 20 activated can be averaged for each type of service in all shops as the number of times the services are provided increases. Therefore, it is possible to more quickly provide the services even in a case in which there are a large number of types of services that are prepared and various types of services are requested by users, for example.

Alternatively, the service management unit 202 may (constantly) activate a specific type of service.

Alternatively, the service management unit 202 can also switch a service that is currently activated to another service on the basis of a predetermined judgement criterion. For example, the service management unit 202 may switch the service to a specific service every time provision of the service ends.

Alternatively, the service management unit 202 may not perform the switching to another type of service. According to the control example, each service host machine 20 provides only a specific type of service.

In addition, setting information related to the aforementioned predetermined judgement criterion is stored in the storage unit 222, for example, and the service management unit 202 can determine a type of a service to be activated on the basis of the setting information. In addition, this setting information may be differently set for each service host machine 20 in advance. In addition, this setting information may be updated on the basis of a history of execution of processing performed by the service execution unit 204, which will be described later.

(2-1-2-3. Service Execution Unit 204)

The service execution unit 204 executes processing related to the service requested by the user on the basis of the processing request received from the RF client machine 10. In a case in which the service is an electronic money service, and the request for payment processing related to the IC card 30 that serves as a processing target is received from the RF client machine 10, for example, the service execution unit 204 performs the payment processing related to the IC card 30 on the basis of a type of electronic money requested by the user and a payment price of transaction requested by the user. Note that the payment of the corresponding transaction is completed if the payment processing is executed.

In addition, the service execution unit 204 stores log information related to the processing executed in the storage unit 222.

(2-1-2-4. Security Processing Unit 206)

The security processing unit 206 performs processing related to security of information transmitted and received to and from the IC card 30. For example, the security processing unit 206 encrypts information to be transmitted to the IC card 30 and decrypts information to be received from the IC card 30 on the basis of a predetermined encryption algorithm. In addition, the security processing unit 206 verifies validity of information of use authority related to the service received from the IC card 30 on the basis of the type of the service requested by the user and a predetermined authentication algorithm.

(2-1-2-5. Communication Control Unit 208)

The communication control unit 208 controls transmission of information to another apparatus. For example, the communication control unit 208 causes the communication unit 220 to transmit response information to the inquiry about whether or not the processing of the service can be performed, which has been received from the RF client machine 10, to the corresponding RF client machine 10. In addition, the communication control unit 208 causes the communication unit 220 to transmit a result of processing executed by the service execution unit 204 to the corresponding RF client machine 10. In addition, the communication control unit 208 causes the communication unit 220 to transmit long information that is stored in the storage unit 222 to the server 40 periodically, for example, once a week.

(2-1-2-6. Communication Unit 220)

The communication unit 220 transmits and receives information to and from another apparatus. For example, the communication unit 220 receives the inquiry about whether or not processing of services can be performed from the RF client machine 10. In addition, the communication unit 220 transmits response information to the received inquiry about whether or not the processing of the services can be performed to the RF client machine 10 in accordance with control performed by the communication control unit 208.

(2-1-2-7. Storage Unit 222)

The storage unit 222 stores various kinds of data and various kinds of software. For example, the storage unit 222 stores setting information and the like related to types of services of which processing can be performed and a judgement criterion for activation of the services.

2-2. Operations

The configuration according to the embodiment has been described above. Next, an operation example according to the embodiment will be described with reference to FIGS. 7 and 8. In addition, an example in which two service host machines 20 (a service host machine 20a and a service host machine 20b) are installed at a shop will be described below.

Figure 7:
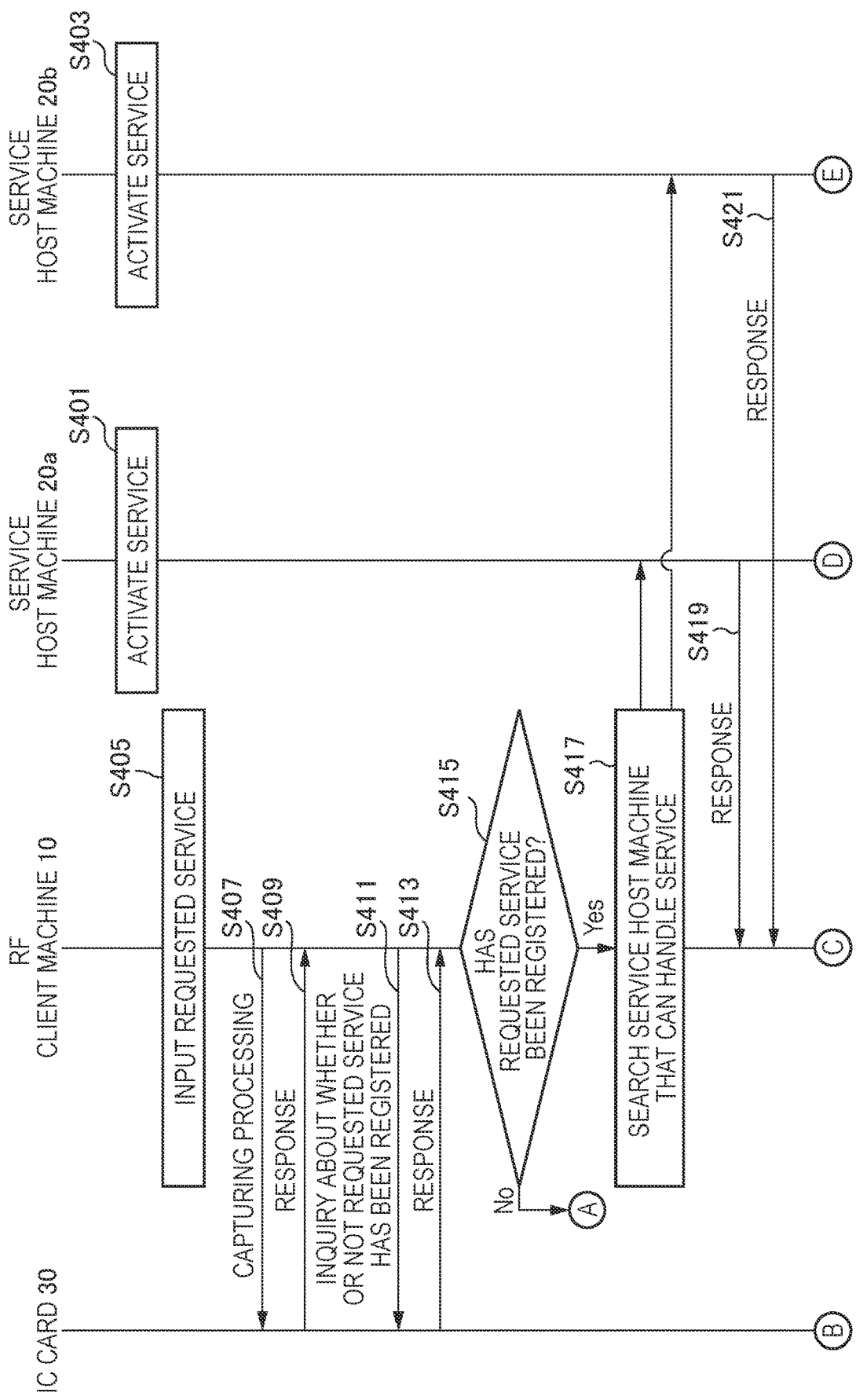
FIG. 7 is a sequence diagram illustrating some operations according to the embodiment.

As illustrated in FIG. 7, the service management unit 202 of the service host machine 20a activates any of a plurality of services on the basis of a predetermined judgement criterion first (S401). Similarly, the service management unit 202 of the service host machine 20b activates any of the plurality of services on the basis of a predetermined judgement criterion (S403).

Thereafter, a user who has visited the shop, for example, tells a shop staff who stays in an installation area of the RF client machine 10 about a type and content of a service that the user desires to use. Then, the shop staff inputs the type and the content of the service requested by the user to the RF client machine 10 (S405). Alternatively, in another example of S405, an automatic machine or an automatic vending machine (not illustrated), for example, is connected to the RF client machine 10 (or is integrally configured with the RF client machine 10), and the user himself/herself can input the type of the service (a type of electronic money, for example) through the automatic machine or the automatic vending machine. Then, the automatic machine or the automatic vending machine can also determine the content (a price, for example) of the corresponding service and then deliver the type and the content of the corresponding service to the RF client machine 10.

Thereafter, the user holds the IC card 3C) over the RF client machine 10. Then, the non-contact communication unit 126 of the RF client machine 10 performs processing of capturing the IC card 30 through NFC, for example (S407). Then, the IC card 30 transmits a response to the RF client machine 10 through the NFC, for example (S409).

Thereafter, the service registration confirmation unit 102 of the RF client machine 10 causes the non-contact communication unit 126 to transmit, to the IC card 30, an inquiry about whether or not registration information related to the service of the type input in S405 is stored in the IC card 30 (S411). Then, the IC card 30 transmits a response to the received inquiry to the RF client machine 10 through the NFC, for example (S413).

Thereafter, in a case in which it is confirmed that the registration information related to the service of the type input in S405 is not stored in the IC card 30 on the basis of the received response (S415: No), the RF client machine 10 ends this operation.

Meanwhile, in a case in which it is confirmed that the registration information related to the service of the type input in S405 is stored in the IC card 30 (S415: Yes), the communication unit 120 transmits an inquiry about whether or not processing of the service requested by the user can be performed to the two service host machines 20 in accordance with the control performed by the transmission control unit 104 (S417).

Thereafter, the communication unit 220 of the service host machine 20a transmits response information to the received inquiry about whether or not the processing of the service can be performed to the RF client machine 10 in accordance with the control performed by the communication control unit 208 (S419). Similarly, the communication unit 220 of the service host machine 20b transmits response information to the received inquiry about whether or not the processing of the service can be performed to the RF client machine 10 in accordance with the control performed by the communication control unit 208 (S421).

Figure 8:
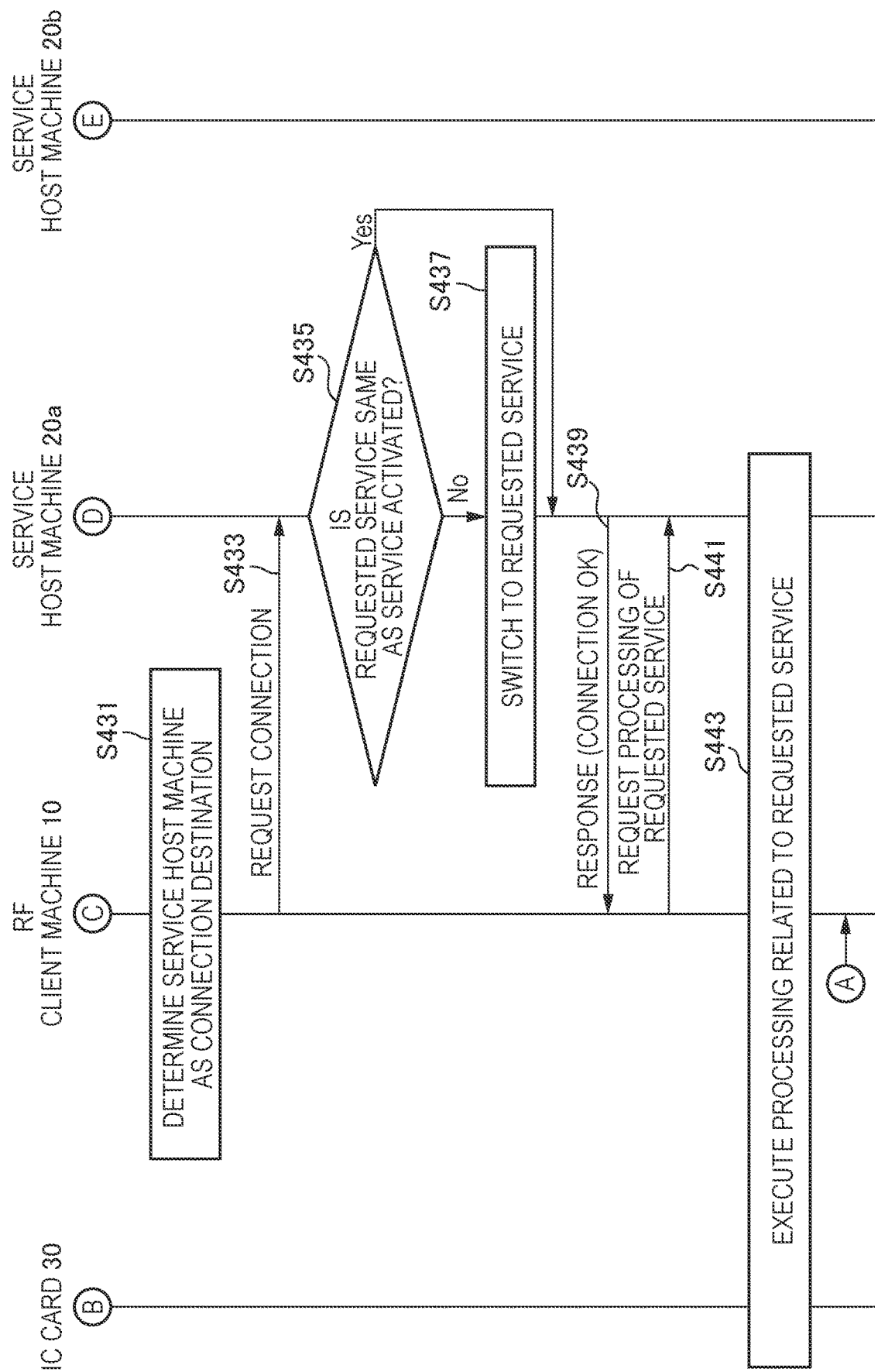
FIG. 8 is a sequence diagram illustrating some operations according to the embodiment.

Here, operations after S421 will be described with reference to FIG. 8. As illustrated in FIG. 8, the connection destination determination unit 106 of the RF client machine 10 determines any of the two service host machines 20 as a connection destination related to the service requested in S405 on the basis of the response information received in S419 and S421 (S431). In addition, the following description will be given on the assumption that the service host machine 2a has been determined to be the connection destination.

Subsequently, the communication unit 120 transmits a connection request to the service host machine 20a in accordance with control performed by the connection destination determination unit 106 (S433).

Thereafter, the service management unit 202 of the service host machine 20a assesses whether or not the service requested by the user and the service that is currently activated coincide with each other (S435). In a case in which the service requested by the user and the service that is currently activated are the same (S435: Yes), the service host machine 20a performs processing in S439, which will be described later.

Meanwhile, in a case in which the service requested by the user and the service that is currently activated are different (S435: No), the service management unit 202 performs processing of switching the service that is currently activated to the service requested by the user (S437).

Subsequently, the communication unit 220 transmits a response indicating connection permission to the RF client machine 10 in accordance with control performed by the communication control unit 208 (S439).

Thereafter, the communication unit 120 of the RF client machine 10 transmits a processing request in accordance with the content of the service input in S405 to the service host machine 20a in accordance with control performed by the processing request unit 108 (S441).

Thereafter, the service execution unit 204 of the service host machine 20a executes processing related to the requested service with the IC card 30 via the RF client machine 10 on the basis of the received processing request.

2-3. Effects

[2-3-1. Effect 1]

According to the embodiment, the RF client machine 10 that has a function of the holding unit and the service host machines 20 that have a service function are configured as separate apparatuses as described above. In addition, the RF client machine 10 transmits the inquiry about whether or not the processing of the service requested by the user can be performed to the plurality of service host machines 20, and then determines any of the plurality of service host machines 20 as the connection destination related to the service on the basis of the response information received from one or more of the plurality of service host machines 20. Therefore, the RF client machine 10 can dynamically determine the service host machine 20 as the connection target related to the requested service, and also, it is not necessary to provide a special apparatus such as a connection management server, for example.

In addition, the RF client machine 10 and the service host machines 20 are not necessarily installed in the same shop and may be installed in different shops. In addition, the service hot machines 20 may be installed in a facility other than the shop as long as the service host machines 20 are connected to the first communication network 42. Therefore, a business operator of shops, for example, can appropriately determine the number of RF client machines 10 and service host machines 20 installed in each shop in accordance with use frequencies of services expected in all shops or each shop. Thus, it is possible to reduce apparatus introduction cost as compared with the known electronic money terminals, for example.

In addition, a frequency of executing the function of the holding unit generally tends to be higher than a frequency of executing the function of the service unit in the electronic money terminals. According to the embodiment, it is possible to reduce the system introduction cost without reducing service providing ability, by setting the number of the RF client machines 10 installed to be greater than the number of service host machines 20 installed, for example.

[2-3-2. Effect 2]

In addition, since the function of the service unit and the function of the holding unit are integrated in each of the known electronic money terminals, the holding unit cannot temporarily be used in a case in which the service function is stopped. Meanwhile, the RE client machine 10 can continue to provide the service by determining another service host machine 20b as the connection destination related to the service requested by the user even in a case in which the certain service host machine 20a temporarily stops the service according to the embodiment. Therefore, it is possible to more stably provide the service with higher redundancy as compared with the known electronic money terminals.

[2-4-3. Effect 3]

In addition, the RF client machine 10 receives the information related to the service that each service host machine 20 is currently activating from each service host machine 20 according to the embodiment. Therefore, in a case in which a plurality of types of services are requested by the user, the RF client machine 10 can provide the requested plurality of types of services by respectively determining the service host machines 20 that are activating the services as connection destinations for the respective requested services. Therefore, it becomes not necessary for a single service host machine 20 to perform processing of switching the services, for example, and the processing of the service host machines 20 are made to be efficient. As a result, it is possible to reduce a waiting time of the user.

In addition, the first communication network 42 is a LAN, for example, and high-speed communication between the RF client machine 10 and the service host machine 20 can be realized. Therefore, even in a case in which the RF machine 10 is connected to different service host machines 20 depending on the types of the requested services, substantially no communication time is needed, and it is possible to provide the services in a short time.

[2-4-4. Effect 4]

In addition, the plurality of service host machines 20 are installed, and the respective service host machines 20 activate services in advance in accordance with a predetermined judgement criterion. Therefore, it is possible to automatically optimize a rate of activated services for the respective types of the services without requiring human management, by customizing the judgement criterion in advance. For example, the respective service host machines 20 dynamically determine the types of the services activated and activate the services on the basis of a use frequency for each type of service in the shop and a use frequency of each service in each time zone. Therefore, it is possible to optimize the system configuration in accordance with a service use situation and the like in the shop and to efficiently provide the services.

3. HARDWARE CONFIGURATION

Figure 9:
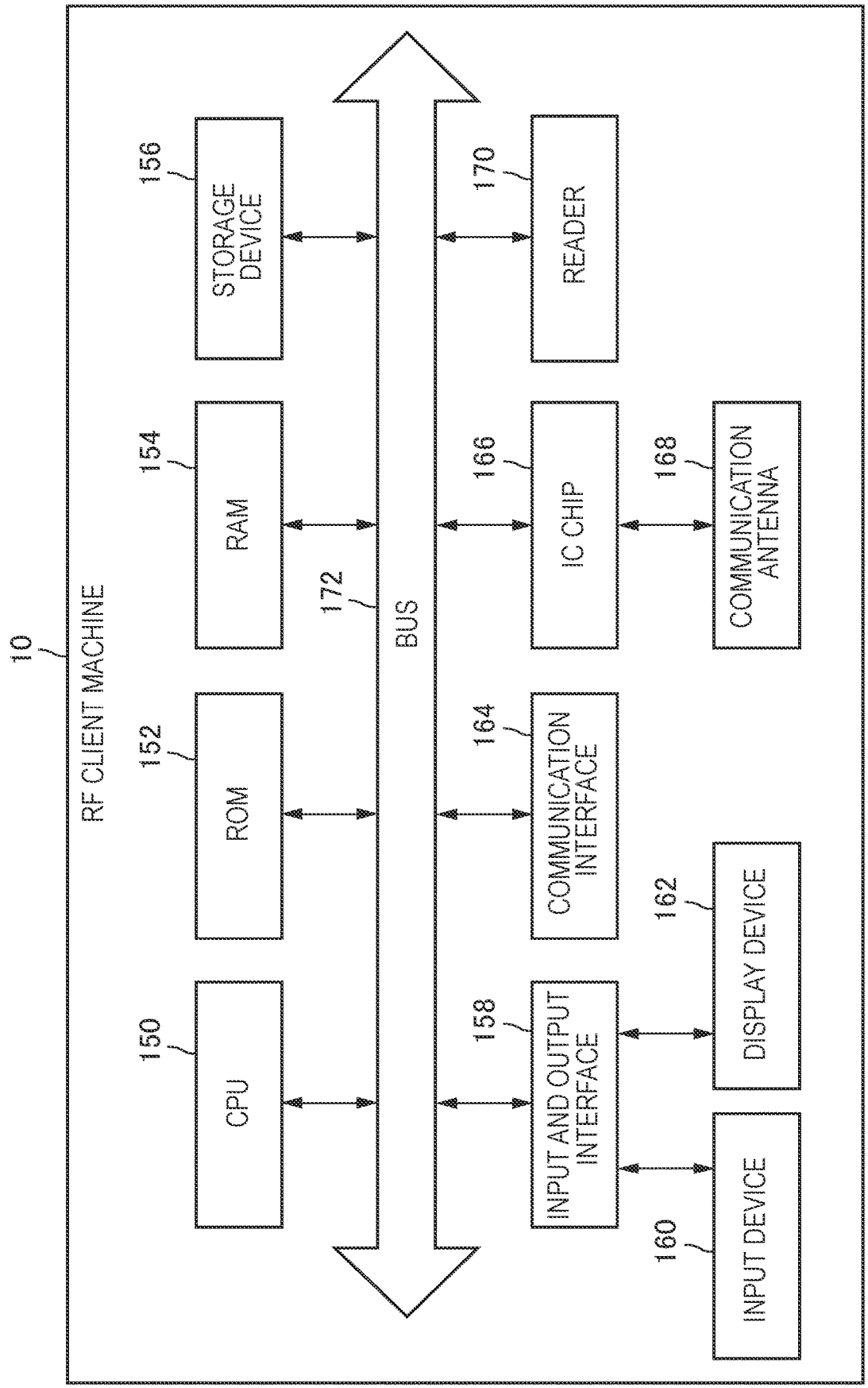
FIG. 9 is an explanatory diagram illustrating a hardware configuration of the RF client machine 10 according to the embodiment.

Next, a hardware configuration of the RF client machine 10 according to the embodiment will be described with reference to FIG. 9. As illustrated in FIG. 9, the RF client machine 10 includes a CPU 150, a ROM 152, a RAM 154, a storage device 156, an input and output interface 158, an input device 160, a display device 162, a communication interface 164, an IC chip 166, a communication antenna 168, and a reader 170. In addition, the RF client machine 10 connects the respective components by a bus 172 that serves as a data transmission path, for example.

The CPU 150 functions as a computation processing device and a control device and controls overall operations in the RF client machine 10 in accordance with various programs. In addition, the CPU 150 realizes the functions of the control unit 100 in the RF client machine 10. In addition, the CPU 150 includes a processor such as a microprocessor.

The ROM 152 stores data for control such as programs and computation parameters that are used by the CPU 150.

The RAM 154 temporarily stores the programs and the like that are executed by the CPU 150, for example.

The storage device 156 stores various kinds of data such as setting information and applications, for example. Here, a magnetic storage device such as a hard disc and a non-volatile memory such as a flash memory are exemplified, for example, as the storage device 156.

The input and output interface 158 connects the input device 160 and the display device 162, for example. The input device 160 functions as the input unit 124, for example, and the display device 162 functions as the display unit 122, for example. Here, a universal serial bus (USB) terminal, a digital visual interface (DVI) terminal, a high-definition multimedia interface (HDMI) (registered trademark) terminal, various processing circuits, and the like are exemplified, for example, as the input and output interface 158.

The input device 160 includes input means for the user to input information, such as a keyboard, a mouse, a button, a microphone, and a switch, for example, an input control circuit that generates an input signal on the basis of a user's input and outputs the input signal to the CPU 150, and the like.

The display device 162 includes, for example, a liquid crystal display (LCD) device, an organic light emitting diode (OLED) device, a lamp, and the like.

The communication interface 164 is communication means provided in the RF client machine 10 and is used for performing wireless/wired communication with an external apparatus such as the service host machine 20, for example, via the first communication network 42 (or directly). This communication interface 164 functions as the communication unit 120, for example. In addition, a communication antenna and an RF circuit (wireless communication), an IEEE802.15.1 port and a transmission and reception circuit (wireless communication), an IEEE802.11b port and a transmission and reception circuit (wireless communication), a LAN terminal and a transmission and reception circuit (wired communication), or the like are exemplified, for example, as the communication interface 164.

The IC chip 166 realizes various functions related to communication by a communication path that is formed by NFC, for example, on an integrated circuit. Here, the IC chip 166 can be connected to the communication antenna 168 that includes a resonance circuit including a coil that serves as a transmission and reception antenna and has predetermined inductance and a capacitor that has predetermined electrostatic capacity, for example. Then, the IC chip 166 performs communication through the communication path that is formed by the NFC via the communication antenna 168. A load modulation circuit that includes a demodulation circuit or a regulator, a load resistance, and a switching circuit and selectively performs load modulation, a processing circuit that controls various kinds of data processing and load modulation, a memory device that can store data, and the like are exemplified, for example, as the circuit on which this IC chip 166 is integrated. In addition, the IC chip 166 may further include a carrier detection circuit that generates a rectangular detection signal for detecting reception of a carrier wave.

The reader 170 includes, for example, a modulation circuit that performs predetermined modulation such as amplitude shift keying (ASK), for example, an amplification circuit that amplifies outputs from the modulation circuit, a coil that has predetermined inductance and the like. This reader 170 generates a high-frequency signal that requests transmission of various kinds of information to an external apparatus or generates a high-frequency signal including various processing commands and data for processing for the external apparatus, for example. In addition, the reader 170 transmits a carrier wave in accordance with the high-frequency signal generated.

4. MODIFICATION EXAMPLES

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the example in which communication is not performed between the plurality of RF client machines 10 has been described in the aforementioned embodiment, the embodiment is not limited to such an example, and it is also possible to perform communication between the plurality of RF client machines 10. In one example, one of the RF client machines 10 (hereinafter, referred to as a specific RF client machine 10a) may be a dedicated apparatus that provides an instruction about the service host machine 20 as the connection destination to the other RF client machines 10b. For example, the specific RF client machine 10a receives a type of a service requested by the user from each of all the other RF client machines 10b and provides an instruction about which of the service host machines 20 connection is to be established to each RF client machine 10b in accordance with a predetermined judgement criterion. Then, each RF client machine 10b connects to the service host machine 20 of the instruction provided by the specific RF client machine 10a.

According to this modification example, it is possible to optimize a connection relation with each RF client machine 10b and the plurality of service host machines 20 in accordance with the situation of the services that are currently requested by users in all shops. Therefore, it is possible to make provision of the services in all the shops efficient and to further reduce the wait time of the users.

In addition, although the example in which the service host machine 20 does not respond to the received inquiry in a case in which the service host machine 20 is communicating with another RF client machine 10b or the server 40 when the inquiry about whether or not the processing of the service can be performed is received from the RF client machine 10a has been described in the aforementioned embodiment, the embodiment is not limited to such an example. For example, the service host machine 20 may delay the response (transmission of the response information) to the received inquiry by a predetermined time or longer. In this manner, the RF client machine 10a can make a judgement that the corresponding service host machine 20 cannot perform the processing of the service on the basis of a time length between a transmission time and a reception time of the response information, for example.

In addition, although the example in which the IC card 30 is applied has been described above, the aforementioned information processing system is not limited to such an example. For example, a mobile phone such as a smartphone, a tablet-type terminal, a wristwatch-type computer, or the like may be applied instead of the IC card 30.

In addition, according to the aforementioned embodiment, it is also possible to provide a computer program to cause hardware such as the CPU 150, the ROM 152, and the RAM 154 to exhibit equivalent functions as those of the respective configurations in the RF client machine 10 according to the aforementioned embodiment. In addition, a recording medium that stores the computer program is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
a transmission control unit that causes a first communication unit to transmit an inquiry about whether or not processing of a first service requested by a user is able to be performed to a plurality of service processing apparatuses; and
a connection destination determination unit that determines any service processing apparatus capable of performing the processing of the first service from among the plurality of service processing apparatuses as a connection destination on a basis of response information that is received from one or more of the plurality of service processing apparatuses.

(2)
The information processing apparatus according to (1), further including:
a second communication unit that performs non-contact communication with an object on a basis of approach of the object that includes an IC chip; and
a service registration confirmation unit that causes the second communication unit to transmit, to the object, an inquiry about information stored in the object in relation to a service requested by the user.

(3)
The information processing apparatus (2), in which the inquiry about the information stored in the object in relation to the service requested by the user includes an inquiry about presence of use authority related to the service requested by the user.

(4)
The information processing apparatus according to (2) or (3), in which in a case in which the service registration confirmation unit has confirmed that the object has registration information related to the service requested by the user, the transmission control unit causes the first communication unit to transmit the inquiry about whether or not the processing of the first service is able to be performed to the plurality of service processing apparatuses.

(5)
The information processing apparatus according to any one of (2) to (4),
in which the response information is information indicating whether or not the service processing apparatuses that are transmission sources of the response information are able to perform the processing of the first service, and
the connection destination determination unit determines, as the connection destination, any of the service processing apparatuses that are the transmission sources of the response information indicating that the processing of the first service is able to be performed.

(6)
The information processing apparatus according to (5), in which the connection destination determination unit determines, as the connection destination, a service processing apparatus that is the transmission source of earliest received response information indicating that the processing of the first service is able to be performed.

(7)
The information processing apparatus according to (5) or (6),
in which the response information is information further indicating a type of a service currently activated in the service processing apparatuses that are the transmission sources of the response information, and
the connection destination determination unit further determines any of the plurality of service processing apparatuses as the connection destination on a basis of the type of the service currently activated in the service processing apparatuses, which is indicated in the response information received from each of one or more service processing apparatuses.

(8)
The information processing apparatus according to (7), in which, in a case in which a service that is currently activated and is indicated in response information received from a first service processing apparatus that is included in the plurality of service processing apparatuses and a first service requested by the user coincide with each other, the connection destination determination unit determines the first service processing apparatus as the connection destination.

(9)
The information processing apparatus according to (8), in which, in a case in which a second service is requested by a user after the request for the first service, and the service that is currently activated and is indicated in the response information received from the first service processing apparatus and the second service coincide with each other, the connection destination determination unit further determines the first service processing apparatus as a connection destination related to the second service.

(10)
The information processing apparatus according to any one of (5) to (9), in which, in a case in which the response information has not been received from a first service processing apparatus that is included in the plurality of service processing apparatuses, the connection destination determination unit does not determine the first service processing apparatus as the connection destination.

(11)
The information processing apparatus according to any one of (2) to further including:
the first communication unit; and
a processing request unit that causes the first communication unit to transmit a service processing request requested by the user to a service processing apparatus that is determined to be a connection destination by the connection destination determination unit.

(12)
The information processing apparatus according to any one of (2) to (11), in which the object is an IC card.

(13)
The information processing apparatus according to any one of (2) to (12), in which the service is an electronic money service.

(14)
A service processing apparatus including:
a service management unit that activates any of a plurality of services on a basis of a predetermined judgement criterion; and
a service execution unit that executes processing related to a service that is activated on a basis of a processing request that is received from an information processing apparatus.

(13)
An information processing method including:
causing a first communication unit to transmit an inquiry about whether or not processing of a first service requested by a user is able to be performed to a plurality of service processing apparatuses; and
determining, by a processor, any service processing apparatus capable of performing the processing of the first service from among the plurality of service processing apparatuses as a connection destination on a basis of response information that is received from one or more of the plurality of service processing apparatuses.

(16) A program that causes a computer to function as:
a transmission control unit that causes a first communication unit to transmit an inquiry about whether or not processing of a first service requested by a user is able to be performed to a plurality of service processing apparatuses; and
a connection destination determination unit that determines any service processing apparatus capable of performing the processing of the first service from among the plurality of service processing apparatuses as a connection destination on a basis of response information that is received from one or more of the plurality of service processing apparatuses.

(17) An information processing system including:
an information processing apparatus; and
a plurality of service processing apparatuses,
in which the information processing apparatus includes
a transmission control unit that causes a first communication unit to transmit an inquiry about whether or not processing of a first service requested by a user is able to be performed to the plurality of service processing apparatuses, and
a connection destination determination unit that determines any service processing apparatus capable of performing the processing of the first service from among the plurality of service processing apparatuses as a connection destination on a basis of response information that is received from one or more of the plurality of service processing apparatuses, and
each of the plurality of service processing apparatuses includes
a service management unit that activates any of a plurality of services on a basis of a predetermined judgement criterion, and
a service execution unit that executes processing related to the first service on a basis of a processing request that is received from the information processing apparatus.

REFERENCE SIGNS LIST

10 RF client machine
20 service host machine
30 IC card
40 server
42 first communication network
44 second communication network
100 control unit
102 service registration confirmation unit
104 transmission control unit
106 connection destination determination unit
108 processing request unit
120 communication unit
122 display unit
124 input unit
126 non-contact communication unit
200 control unit
202 service management unit
204 service execution unit
206 security processing unit
208 communication control unit
220 communication unit
222 storage unit

The invention claimed is:

1. An information processing apparatus comprising:
a transmission control unit that causes a first communication unit to transmit an inquiry about whether or not processing of a first service requested by a user is able to be performed to a plurality of service processing apparatuses;
a connection destination determination unit that determines any service processing apparatus capable of performing the processing of the first service from among the plurality of service processing apparatuses as a connection destination on a basis of response information that is received from one or more of the plurality of service processing apparatuses;
a second communication unit that performs non-contact communication with an object on a basis of approach of the object that includes an IC chip; and
a service registration confirmation unit that causes the second communication unit to transmit, to the object, an inquiry about information stored in the object in relation to a service requested by the user,
wherein in a case in which the service registration confirmation unit has confirmed that the object has registration information related to the service requested by the user, the transmission control unit causes the first communication unit to transmit the inquiry about whether or not the processing of the first service is able to be performed to the plurality of service processing apparatuses,
wherein the response information is information indicating whether or not the service processing apparatuses that are transmission sources of the response information are able to perform the processing of the first service,
wherein the connection destination determination unit determines, as the connection destination, any of the service processing apparatuses that are the transmission sources of the response information indicating that the processing of the first service is able to be performed, and
wherein the transmission control unit, the first communication unit, the service processing apparatuses, the second communication unit, the service registration confirmation unit, and the connection destination determination unit are each implemented via at least one processor.

2. The information processing apparatus according to claim 1, wherein the inquiry about the information stored in the object in relation to the service requested by the user includes an inquiry about presence of use authority related to the service requested by the user.

3. The information processing apparatus according to claim 1, wherein the connection destination determination unit determines, as the connection destination, a service processing apparatus that is the transmission source of earliest received response information indicating that the processing of the first service is able to be performed.

4. The information processing apparatus according to claim 1,
wherein the response information is information further indicating a type of a service currently activated in the service processing apparatuses that are the transmission sources of the response information, and the connection destination determination unit further determines any of the plurality of service processing apparatuses as the connection destination on a basis of the type of the service currently activated in the service processing apparatuses, which is indicated in the response information received from each of one or more service processing apparatuses.

5. The information processing apparatus according to claim 4, wherein, in a case in which a service that is currently activated and is indicated in response information received from a first service processing apparatus that is included in the plurality of service processing apparatuses and a first service requested by the user coincide with each other, the connection destination determination unit determines the first service processing apparatus as the connection destination.

6. The information processing apparatus according to claim 5, wherein, in a case in which a second service is requested by a user after the request for the first service, and the service that is currently activated and is indicated in the response information received from the first service processing apparatus and the second service coincide with each other, the connection destination determination unit further determines the first service processing apparatus as a connection destination related to the second service.

7. The information processing apparatus according to claim 1, wherein, in a case in which the response information has not been received from a first service processing apparatus that is included in the plurality of service processing apparatuses, the connection destination determination unit does not determine the first service processing apparatus as the connection destination.

8. The information processing apparatus according to claim 1, further comprising:
the first communication unit; and
a processing request unit that causes the first communication unit to transmit a service processing request requested by the user to a service processing apparatus that is determined to be a connection destination by the connection destination determination unit,
wherein the processing request unit and the service processing apparatus are each implemented via at least one processor.

9. The information processing apparatus according to claim 1, wherein the object is an IC card.

10. The information processing apparatus according to claim 1, wherein the service is an electronic money service.

11. A service processing apparatus comprising:
the information processing apparatus according to claim 1,
a service management unit that activates any of a plurality of services on a basis of a predetermined judgement criterion; and
a service execution unit that executes processing related to a service that is activated on a basis of a processing request that is received from the information processing apparatus,
wherein the service management unit and the service execution unit are each implemented via at least one processor.

12. The information processing apparatus according to claim 1, wherein the service is a point service or an individual authentication.

13. An information processing method comprising:
causing a first communication unit to transmit an inquiry about whether or not processing of a first service requested by a user is able to be performed to a plurality of service processing apparatuses;
determining, by a processor, any service processing apparatus capable of performing the processing of the first service from among the plurality of service processing apparatuses as a connection destination on a basis of response information that is received from one or more of the plurality of service processing apparatuses;
causing a second communication unit to perform non-contact communication with an object on a basis of approach of the object that includes an IC chip;
causing the second communication unit to transmit, to the object, an inquiry about information stored in the object in relation to a service requested by the user; and
causing, in a case in which the object is confirmed to have registration information related to the service requested by the user, the first communication unit to transmit the inquiry about whether or not the processing of the first service is able to be performed to the plurality of service processing apparatuses,
wherein the response information is information indicating whether or not the service processing apparatuses that are transmission sources of the response information are able to perform the processing of the first service, and
wherein any of the service processing apparatuses that are the transmission sources of the response information indicating that the processing of the first service is able to be performed are determined as the connection destination.

14. A non-transitory computer-readable medium having embodied thereon a program, which when executed by a computer causes the computer to execute a method, the method comprising:
causing a first communication unit to transmit an inquiry about whether or not processing of a first service requested by a user is able to be performed to a plurality of service processing apparatuses; and
determining any service processing apparatus capable of performing the processing of the first service from among the plurality of service processing apparatuses as a connection destination on a basis of response information that is received from one or more of the plurality of service processing apparatuses,
causing a second communication unit to perform non-contact communication with an object on a basis of approach of the object that includes an IC chip;
causing the second communication unit to transmit, to the object, an inquiry about information stored in the object in relation to a service requested by the user; and
causing, in a case in which the object is confirmed to have registration information related to the service requested by the user, the first communication unit to transmit the inquiry about whether or not the processing of the first service is able to be performed to the plurality of service processing apparatuses,
wherein the response information is information indicating whether or not the service processing apparatuses that are transmission sources of the response information are able to perform the processing of the first service, and
wherein any of the service processing apparatuses that are the transmission sources of the response information indicating that the processing of the first service is able to be performed are determined as the connection destination.

15. An information processing system comprising:
an information processing apparatus; and
a plurality of service processing apparatuses,
wherein the information processing apparatus includes
  a transmission control unit that causes a first communication unit to transmit an inquiry about whether or not processing of a first service requested by a user is able to be performed to the plurality of service processing apparatuses, and
  a connection destination determination unit that determines any service processing apparatus capable of performing the processing of the first service from among the plurality of service processing apparatuses as a connection destination on a basis of response information that is received from one or more of the plurality of service processing apparatuses,
a second communication unit that performs non-contact communication with an object on a basis of approach of the object that includes an IC chip; and
a service registration confirmation unit that causes the second communication unit to transmit, to the object, an inquiry about information stored in the object in relation to a service requested by the user,
wherein in a case in which the service registration confirmation unit has confirmed that the object has registration information related to the service requested by the user, the transmission control unit causes the first communication unit to transmit the inquiry about whether or not the processing of the first service is able to be performed to the plurality of service processing apparatuses,
wherein the response information is information indicating whether or not the service processing apparatuses that are transmission sources of the response information are able to perform the processing of the first service, and
wherein the connection destination determination unit determines, as the connection destination, any of the service processing apparatuses that are the transmission sources of the response information indicating that the processing of the first service is able to be performed, and
each of the plurality of service processing apparatuses includes
  a service management unit that activates any of a plurality of services on a basis of a predetermined judgement criterion, and
  a service execution unit that executes processing related to the first service on a basis of a processing request that is received from the information processing apparatus,
wherein the information processing apparatus, the service processing apparatuses, the transmission control unit, the first communication unit, the connection destination determination unit, the service management unit, the second communication unit, the service registration confirmation unit, and the service execution unit are each implemented via at least one processor.

* * * * *